US00RE49430E

(19) United States
(12) Reissued Patent
Schwartz et al.

(10) Patent Number: US RE49,430 E
(45) Date of Reissued Patent: Feb. 28, 2023

(54) DOCKING STATION FOR A ROBOTIC PLATFORM

(71) Applicant: FLORIDA POWER & LIGHT COMPANY, Juno Beach, FL (US)

(72) Inventors: Eric Schwartz, Palm Beach Gardens, FL (US); Stephen Cross, North Palm Beach, FL (US); Michael Gilbertson, Cooper City, FL (US); Kyle Bush, Palm Beach Gardens, FL (US); David Wendeborn, Portland, OR (US); Leonard Rummel, Corvalis, OR (US)

(73) Assignee: Florida Power & Light Company, Juno Beach, FL (US)

(21) Appl. No.: 29/865,599

(22) Filed: Aug. 10, 2022

Related U.S. Patent Documents

Reissue of:
(64) Patent No.: Des. 907,676
Issued: Jan. 12, 2021
Appl. No.: 29/668,475
Filed: Oct. 30, 2018

(51) LOC (14) Cl. ..... 15-99
(52) U.S. Cl.
USPC ..... D15/199
(58) Field of Classification Search
USPC ..... D15/199
CPC .... B60L 53/35; B60L 2260/32; G05D 1/0225
See application file for complete search history.

(56) References Cited

U.S. PATENT DOCUMENTS

2008/0136668 A1* 6/2008 Song ..... G05D 1/0242 414/281
2015/0314453 A1* 11/2015 Witelson ..... H02J 50/10 241/101.5
2017/0043966 A1* 2/2017 Witelson ..... B01D 33/37
2018/0275668 A1* 9/2018 Diehr ..... B08B 3/02
2019/0001819 A1* 1/2019 Stehr ..... B60L 5/40
2019/0059680 A1* 2/2019 Fox ..... A47L 11/4091
2019/0100109 A1* 4/2019 Wendeborn ..... B60L 53/14
2019/0338546 A1* 11/2019 Witelson ..... E04H 4/1654
2020/0021122 A1* 1/2020 Lydon ..... H02J 7/0044
2020/0091744 A1* 3/2020 Vain ..... B60L 53/65
2020/0130523 A1* 4/2020 Wendeborn ..... G05D 1/0225
2020/0133287 A1* 4/2020 Wendeborn ..... G05D 1/0225

* cited by examiner

*Primary Examiner* — Philip S Hyder
(74) *Attorney, Agent, or Firm* — Fleit Intellectual Property Law; Jon Gibbons

(57) CLAIM

The ornamental design for a docking station for a robotic platform, as shown and described.

DESCRIPTION

FIG. 1 is a front-perspective view of a docking station for a robotic platform, according to an embodiment;
FIG. 2 is a back-perspective view thereof;
FIG. 3 is a front view thereof;
FIG. 4 is a rear view thereof;
FIG. 5 is a left view thereof;
FIG. 6 is a right view thereof;
FIG. 7 is a lop view thereof; and,
FIG. 8 is a bottom view thereof.
The broken lines in the drawings depict portions of the docking station for a robotic platform and from no part of the claimed design.

1 Claim, 8 Drawing Sheets

Figure 1:
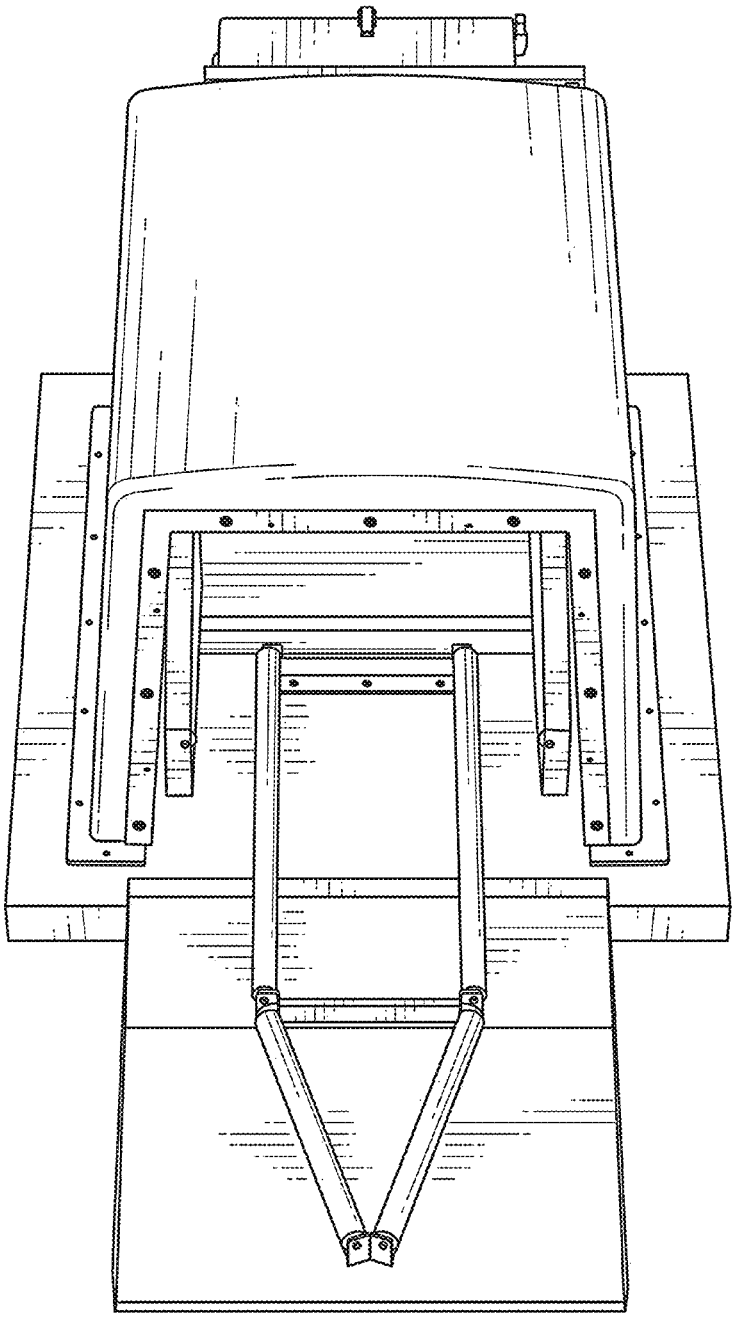
Figure 2:
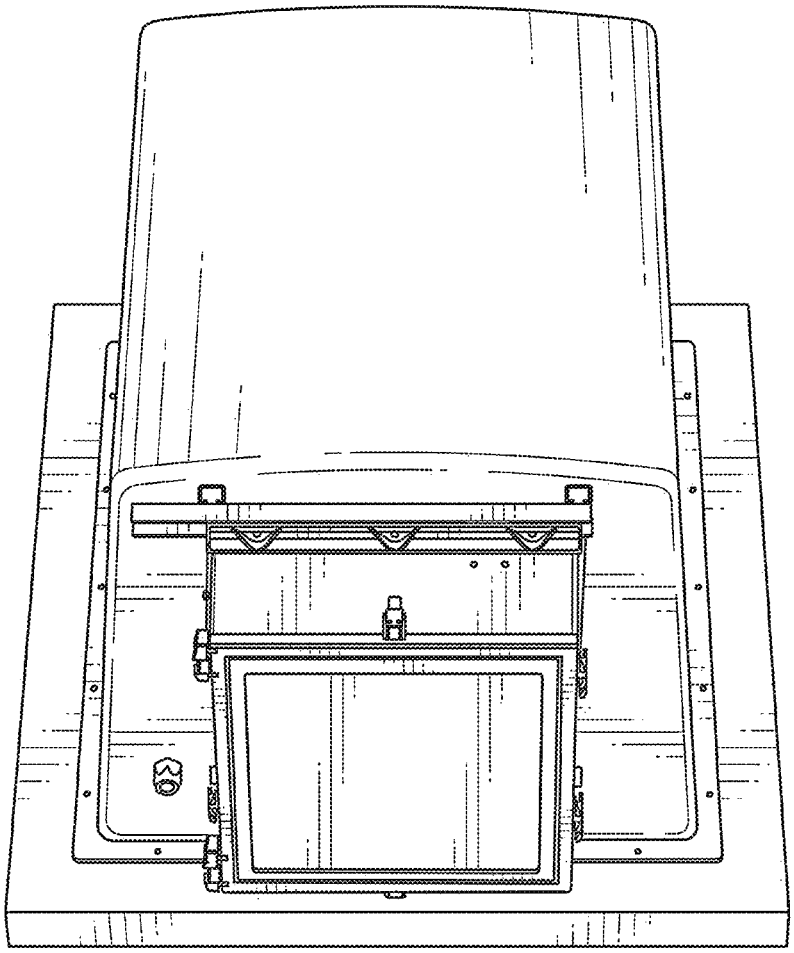
Figure 3:
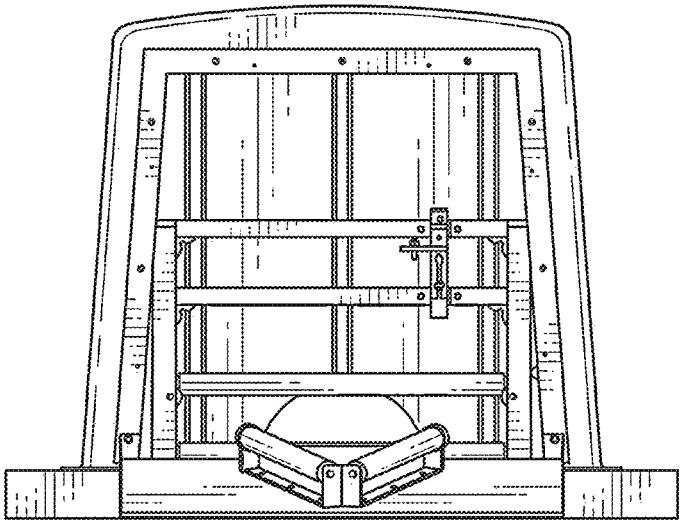
Figure 4:
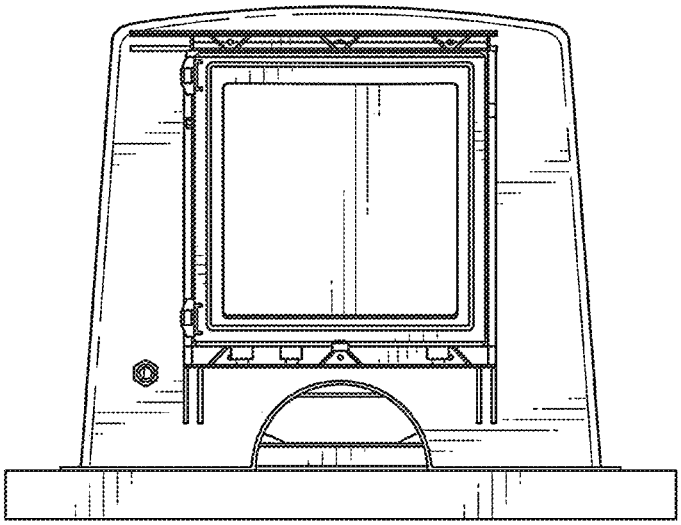
Figure 5:
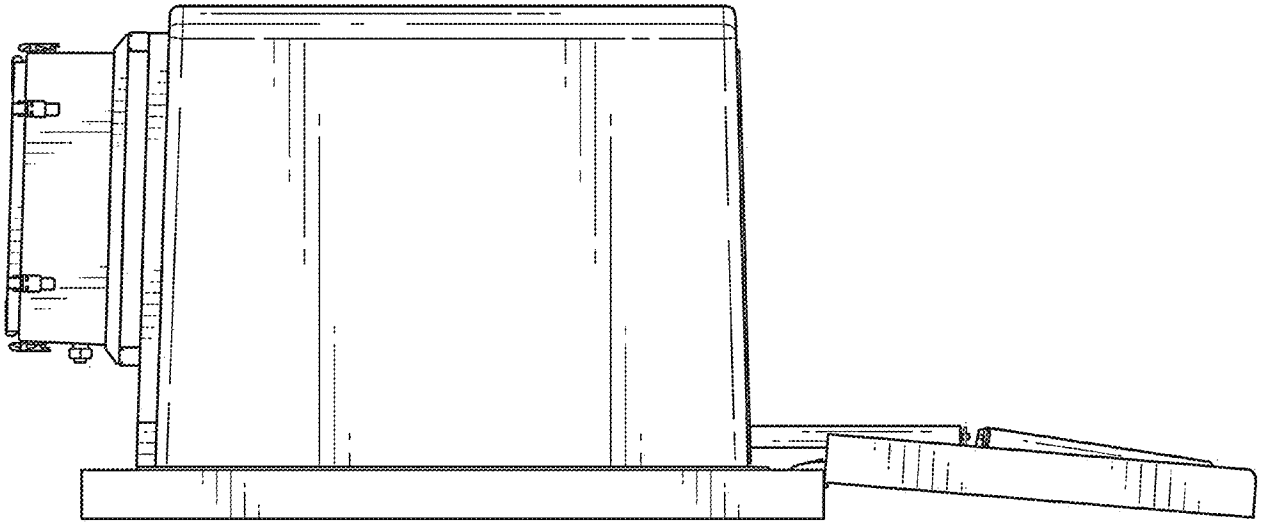
Figure 6:
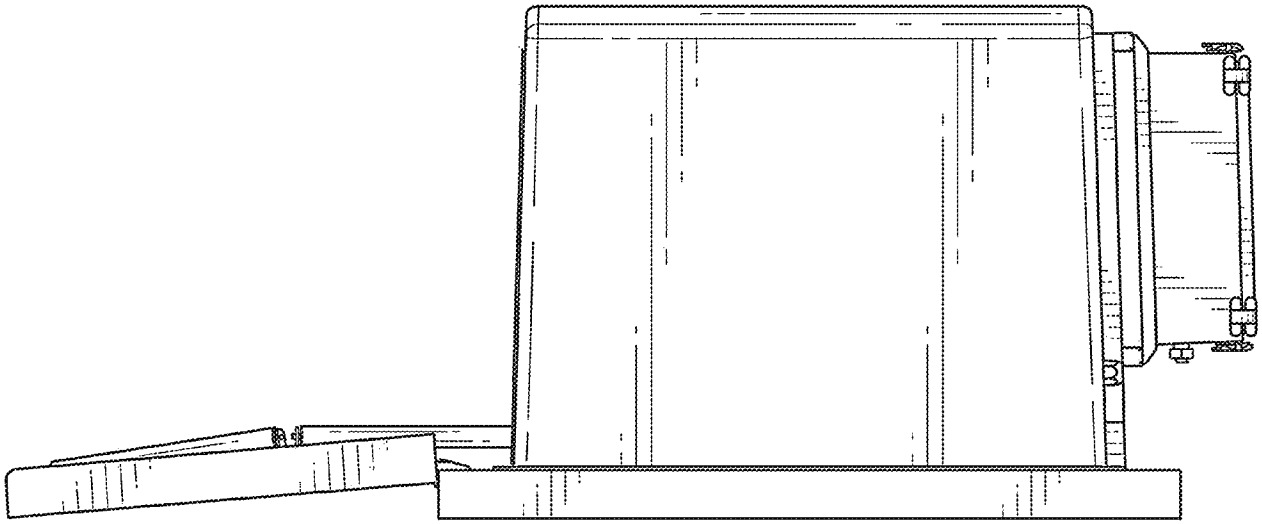
Figure 7:
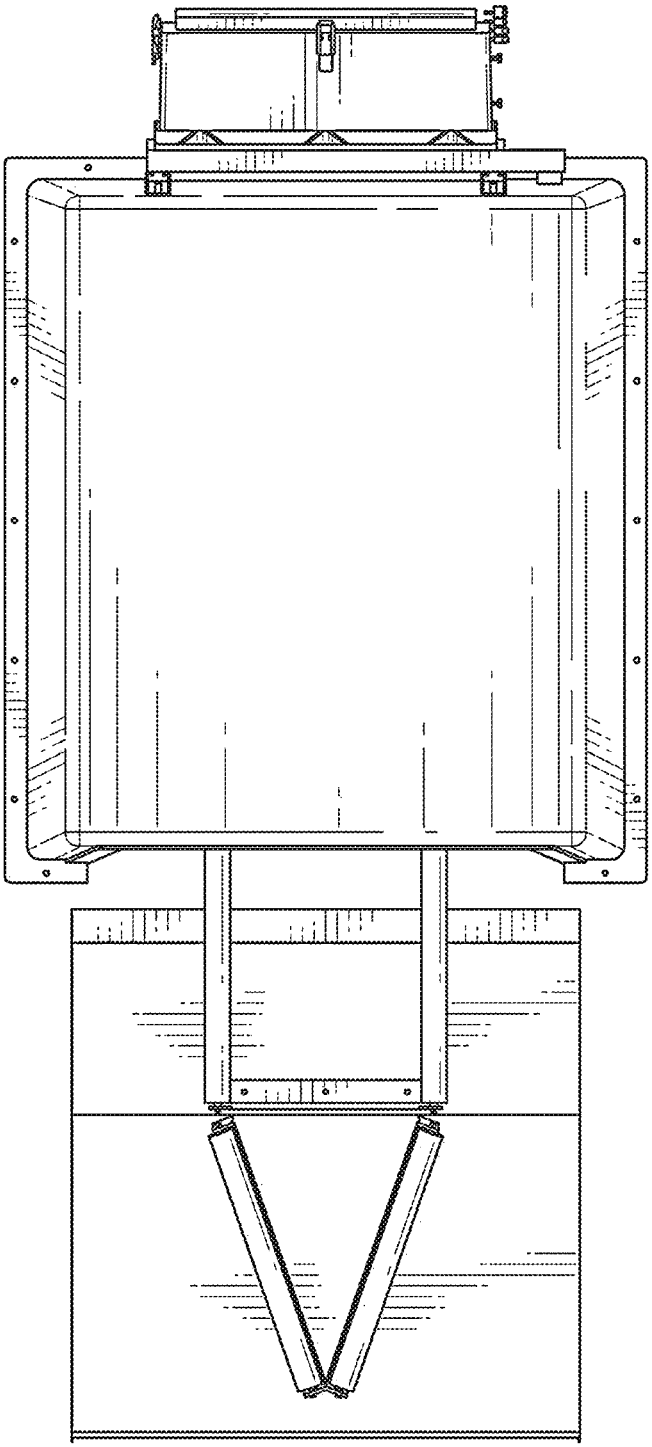
Figure 8:
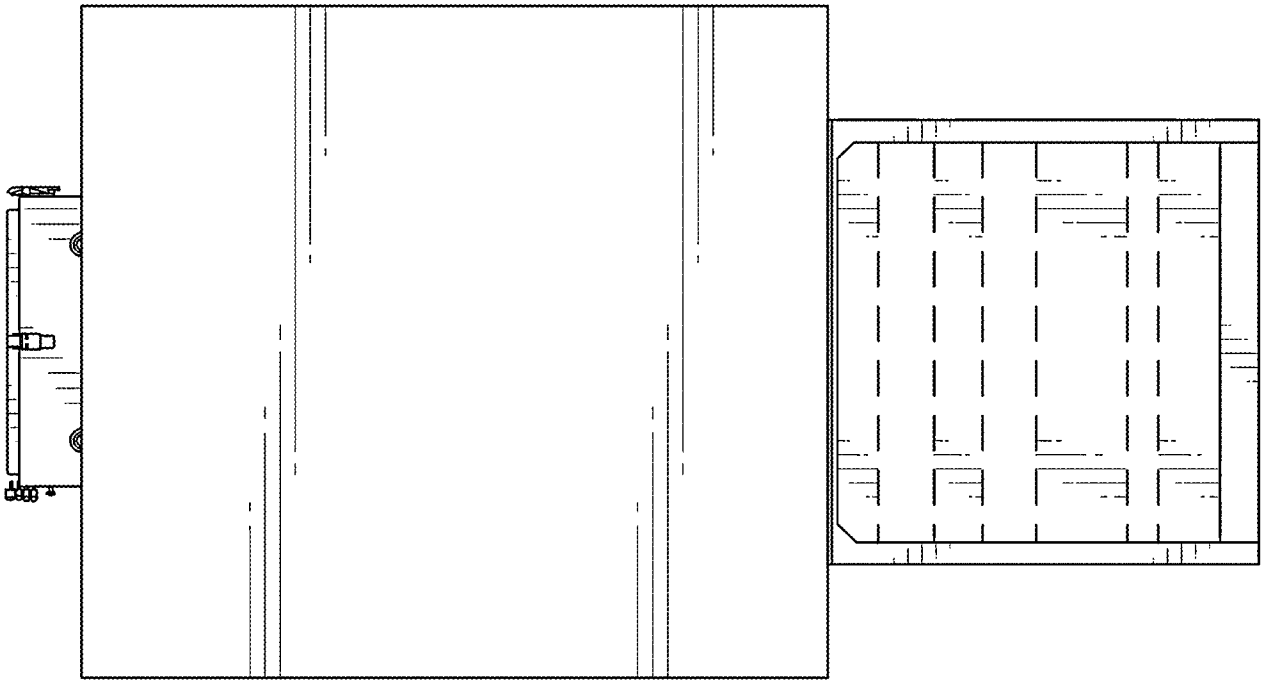

Matter enclosed in heavy brackets [ ] appears in the original patent but forms no part of this reissue; matter printed in italics indicates the additions made by reissue.